United States Patent
Hall

(10) Patent No.: US 8,730,935 B2
(45) Date of Patent: May 20, 2014

(54) METHOD AND SYSTEM FOR BLUETOOTH CONNECTION SETUP IN A MULTI-STANDARD MULTI-RADIO COMMUNICATION SYSTEM

(75) Inventor: Steven Hall, Olivenhain, CA (US)

(73) Assignee: Broadcom Corporation, Irvine, CA (US)

( * ) Notice: Subject to any disclaimer, the term of this patent is extended or adjusted under 35 U.S.C. 154(b) by 949 days.

(21) Appl. No.: 12/482,112

(22) Filed: Jun. 10, 2009

(65) Prior Publication Data

US 2010/0046496 A1 Feb. 25, 2010

Related U.S. Application Data

(60) Provisional application No. 61/090,174, filed on Aug. 19, 2008.

(51) Int. Cl.
*H04J 3/00* (2006.01)

(52) U.S. Cl.
USPC .......................................................... 370/345

(58) Field of Classification Search
None
See application file for complete search history.

(56) References Cited

U.S. PATENT DOCUMENTS

| | | | |
|---|---|---|---|
| 2002/0176445 A1* | 11/2002 | Melpignano | 370/480 |
| 2006/0292987 A1* | 12/2006 | Ophir et al. | 455/41.2 |
| 2007/0275746 A1 | 11/2007 | Bitran | |
| 2008/0130620 A1 | 6/2008 | Liu et al. | |

OTHER PUBLICATIONS

Chinese language office action dated Dec. 7, 2011.

* cited by examiner

*Primary Examiner* — Chi Pham
*Assistant Examiner* — Kouroush Mohebbi
(74) *Attorney, Agent, or Firm* — McDermott Will & Emery LLP

(57) ABSTRACT

Aspects of a method and system for Bluetooth connection setup in a multi-standard multi-radio communication system are provided. In this regard, a Bluetooth system may be operable to determine whether a coexistent time division multiplexing communication system is receiving signals and to control the types of packets it transmits based on the determination. While the coexistent time division multiplexing communication system is receiving signals, the Bluetooth system may be limited to transmission of Bluetooth packets that enable establishment of a Bluetooth connection. For example the Bluetooth system may be limited to sending ID packets in response to page packets and FHS packets and/or may be limited to sending FHS packets. Also, the Bluetooth system may refrain from transmitting packets while the Bluetooth system is connected as a piconet master and while the time division multiplexing communication system is receiving.

23 Claims, 12 Drawing Sheets

METHOD AND SYSTEM FOR BLUETOOTH CONNECTION SETUP IN A MULTI-STANDARD MULTI-RADIO COMMUNICATION SYSTEM

CROSS-REFERENCE TO RELATED APPLICATIONS/INCORPORATION BY REFERENCE

This patent application makes reference to, claims priority to and claims benefit from U.S. Provisional Patent Application Ser. No. 61/090,174 filed on Aug. 19, 2008.

The above stated application is hereby incorporated herein by reference in its entirety.

FIELD OF THE INVENTION

Certain embodiments of the invention relate to wireless communications. More specifically, certain embodiments of the invention relate to a method and system for method and system for Bluetooth connection setup in a multi-standard multi-radio communication system.

BACKGROUND OF THE INVENTION

The wireless communications industry has seen explosive growth in recent years and shows no signs of slowing. For example, Bluetooth and WiMAX are technologies that are seeing widespread growth in terms of both numbers and types of compatible devices.

Bluetooth (BT) and other standards which utilize time division multiplexing (TDM), such as WiMAX, may operate on closely spaced or even overlapping frequencies. Thus, there may be coexistence issues that confront designers seeking to integrate, or operate in close proximity, Bluetooth systems and other TDM systems. For example, Bluetooth and other standards utilizing TDM, such as WiMAX, operated in close proximity may interfere with each other. In this regard, although Bluetooth and other standards utilizing TDM may utilize spread spectrum techniques to help mitigate the impact of multiple transmitters and/or receivers in close proximity, the performance of Bluetooth and such networks operating in close proximity may nonetheless be degraded. Accordingly, significant opportunities may exist for improving coexistence of Bluetooth and other standards utilizing TDM, and even for benefiting from such coexistence.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Bluetooth connection setup in a multi-standard multi-radio communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for Bluetooth connection setup in a multi-standard multi-radio communication system. In various embodiments of the invention, a Bluetooth system may be operable to determine whether a coexistent time division multiplexing communication system is receiving signals. The types of packets transmitted by the Bluetooth system may be controlled based on the determination. In this regard, while the coexistent time division multiplexing communication system is receiving signals, the Bluetooth system may be limited to transmission of Bluetooth packets that enable establishment of a Bluetooth connection. For example, the Bluetooth system may be limited to sending ID packets in response to page packets and FHS packets and/or may be limited to sending FHS packets. Also, the Bluetooth system may refrain from transmitting packets while the Bluetooth system is connected as a piconet master and while the time division multiplexing communication system is receiving. After establishing a Bluetooth connection, the Bluetooth system may switch from a piconet slave mode to a piconet master mode. Additionally, in some instances, the Bluetooth system may refrain from receiving Bluetooth signals while the time division multiplexing communication system is transmitting. In other instances, the Bluetooth system may attempt to receive Bluetooth signals while the TDM communication system is transmitting, and success of such receptions may or may not be successful. The Bluetooth system may be synchronized to the time division multiplexing communication system. The time division multiplexing communication system may, for example, comprise a WiMAX system or a LTE system. The time division multiplexing communication system may operate in one of a normal mode and a sleep mode. While operating in "normal mode," the time division multiplexing communication system transmits and receives in every frame. While operating in "sleep mode," the TDM communication system may be periodically inactive—for example it could be active for two frames and inactive for two frames.

Figure 1:
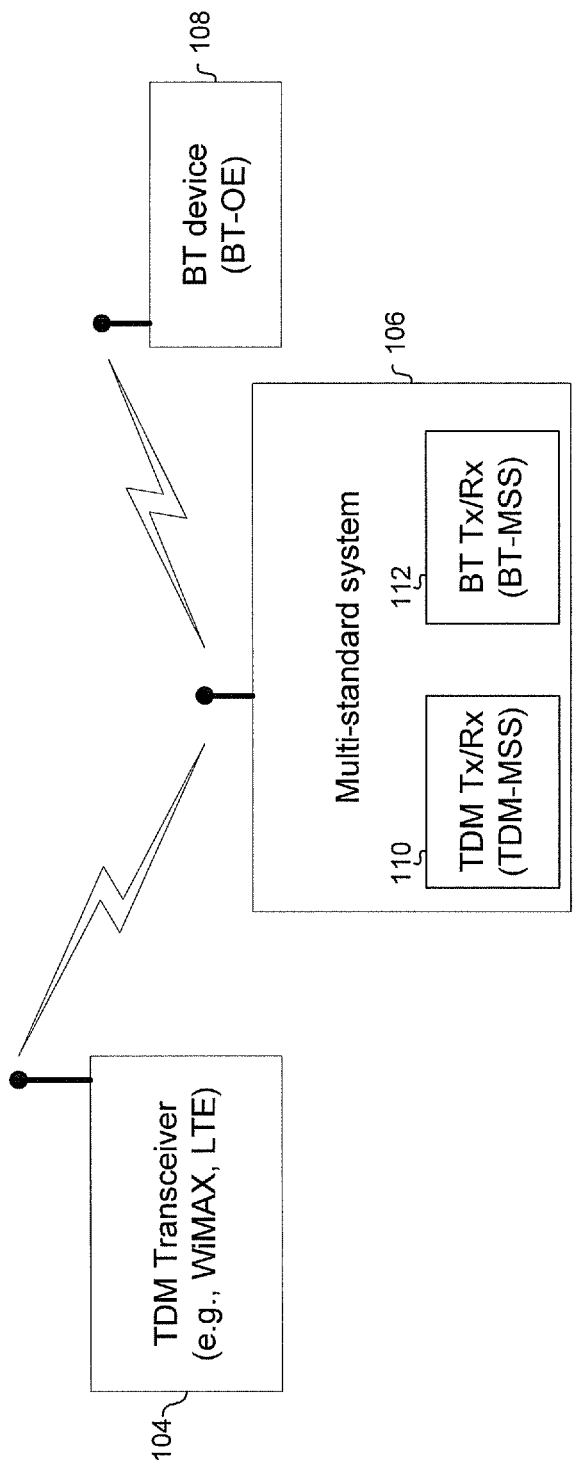
FIG. 1 is a diagram illustrating a multi-radio system communicating with a Bluetooth device and another transceiver which utilizes time division multiplexing (TDM), in accordance with an embodiment of the invention.

FIG. 1 is a diagram illustrating a multi-radio system communicating with a Bluetooth device and another transceiver which utilizes time division multiplexing (TDM), in accordance with an embodiment of the invention. Referring to FIG. 1 there is shown a transceiver 104 which communicates utilizing one or more TDM standards such as WiMAX or 3GPP LTE, a Bluetooth device 108, and a multi-standard multi-radio communication system 106 that may communicate in adherence to Bluetooth standards and one or more other standards which utilize TDM.

The transceiver 104 may comprise suitable logic, circuitry, interface(s) and/or code that may be operable to communicate wirelessly utilizing one or more TDM based standards. For example, the transceiver 104 may be operable to transmit during some timeslots and receive during other timeslots. Alternatively, the transceiver 104 may simultaneously transmit and receive during some timeslots and may be inactive during other timeslots. In various exemplary embodiments of the invention, the transceiver 104 may be a cellular or WiMAX base station.

The Bluetooth device on the other end (BT-OE) 108 may comprise suitable logic, circuitry, interface(s) and/or code for communicating in adherence to Bluetooth standards. The BT-OE 108 may be, for example, a wireless headset, a personal computer, or an input or other peripheral device.

The multi-standard multi-radio communication system 106 may comprise suitable logic, circuitry, interface(s) and/or code operable to communicate in adherence to Bluetooth standards and at least one other TDM based standard. In this regard, the multi-standard, multi-radio communication system 106 may comprise TDM portion 110 (TDM-MSS) a BT portion (BT-MSS) 112. The portions 110 and 112 may be separate or may share logic, circuitry, interfaces, and/or code. In various exemplary embodiments of the invention, the multi-standard multi-radio communication system 106 may be a single device such as smart phone or a laptop computer or may be a plurality of devices communicatively coupled via one or more wired, wireless, and/or optical links. In some embodiments of the invention, the TDM-MSS 110 may operate in a sleep mode. In this regard, during occasional, or periodically spaced, timeslots, the TDM-MSS 110 may refrain from transmitting and receiving. For example, the TDM-MSS 110 may alternate between an active state for two timeslots and an inactive state for two timeslots.

In operation, the multi-standard multi-radio communication system 106 may be operable to minimize interference between, and/or the necessity for retransmissions by, the transceiver 104, the multi-standard multi-radio communication system 106, and/or the Bluetooth device 108. In this regard, the multi-standard multi-radio communication system 106 may be enabled to avoid transmitting Bluetooth signals at the same time it is receiving signals from the transceiver 104 and/or avoid transmitting to the transceiver 108 at the same time it is receiving Bluetooth signals. Accordingly, one or more control signals may be communicated from the TDM-MSS 110 to the BT-MSS 112 to coordinate transmission and/or reception. However, attempting to completely avoid interference between the TDM-MSS 110 and the BT-MSS 112 may prevent reliable and quick establishment of BT connections between the BT-MSS 112 and the BT-OE 108. Accordingly, various aspects of the invention may enable the BT-MSS 112 to utilize the one or more control signals from the TDM-MSS 110 to, for example, limit interference but still enable quick and reliable establishment of BT connections. In this regard, the BT-MSS 112 may be operable to honor the control signal(s) at times other than brief periods when the BT-MSS 112 may be connecting to another BT device.

Figure 2:
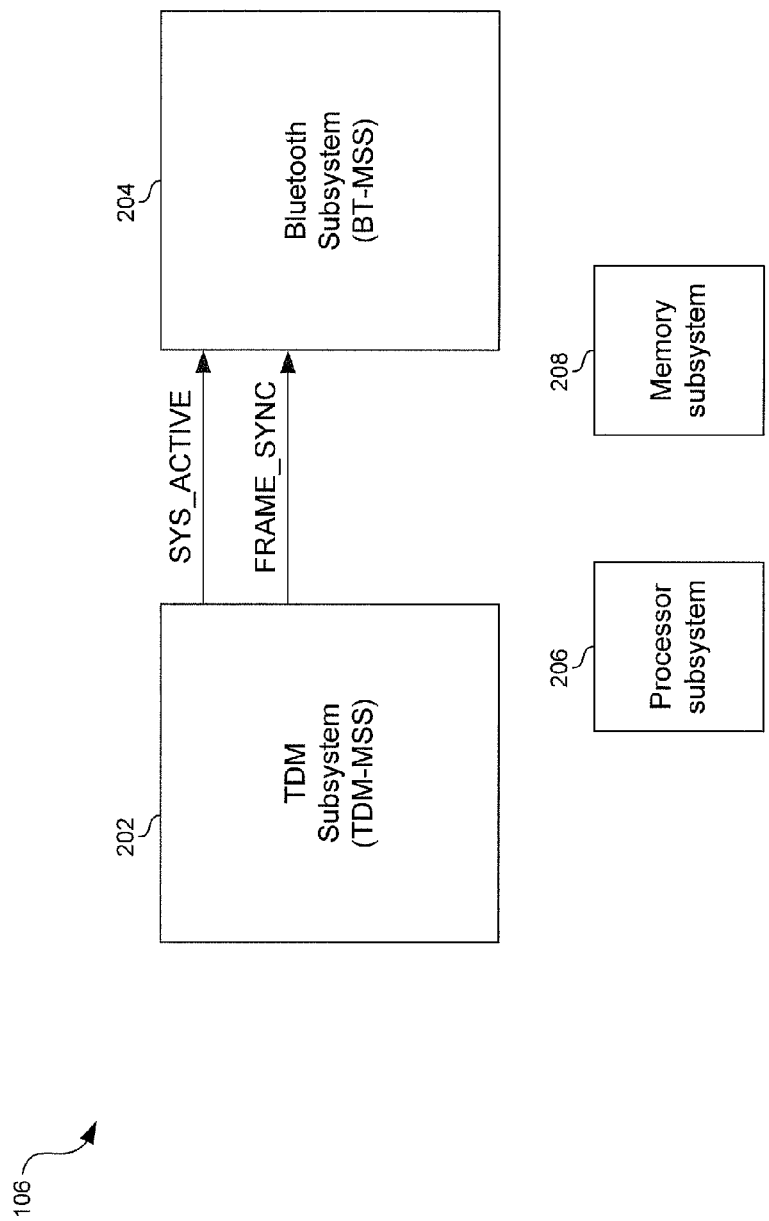
FIG. 2 is a block diagram illustrating an exemplary multi-standard system, in accordance with an embodiment of the invention.

FIG. 2 is a block diagram illustrating an exemplary multi-standard system, in accordance with an embodiment of the invention. Referring to FIG. 2, the system may comprise a TDM subsystem (TDM-MSS) 202, a Bluetooth subsystem (BT-MSS) 204, a processor subsystem 206, and a memory subsystem 208. In one exemplary embodiment of the invention, the TDM-MSS 202 and the BT-MSS 204 may be separately housed in close proximity, and may be communicatively coupled via one or more wired, wireless, and/or optical cables. In one exemplary embodiment of the invention, the TDM-MSS 202 and the BT-MSS 204 may each comprise one or more printed circuit boards (PCBs) within a common housing, and may be communicatively coupled via one or more wires or other inter-PCB connections. In one exemplary embodiment of the invention, the TDM-MSS 202 and the BT-MSS 204 may each comprise one or more integrated circuits and may be communicatively coupled via one or more traces of a PCB. In one exemplary embodiment of the invention, the TDM-MSS 202 and the BT-MSS 204 each comprise one or portions of an integrated circuit fabricated on a substrate and may be communicatively coupled via, for example, one or more metal or polysilicon layers.

The TDM-MSS 202 may comprise suitable logic, circuitry, interface(s) and/or code that may be operable to transmit and/or receive signals in accordance with one or more TDM based standards. For example, the TDM-MSS 202 may be operable to communicate with cellular and/or WiMAX base stations.

The BT-MSS 204 may comprise suitable logic, circuitry, interface(s) and/or code that may be operable to transmit and/or receive signals in accordance with Bluetooth standards. For example, the BT-MSS 204 may be operable to communicate with Bluetooth enabled phones, computers, and/or peripherals.

The processor subsystem 206 may comprise suitable logic, circuitry, interface(s) and/or code that may be operable to process data and/or control one or more operations and/or functions of the multi-standard multi-radio communication system 106. In this regard, the processor subsystem 206 may be enabled to provide and/or receive control signals to and/or from the various other portions of the multi-standard multi-radio communication system 106. The processor subsystem 206 may also control data transfers between various portions of the multi-standard multi-radio communication system 106. Additionally, the processor subsystem 206 may enable execution of applications programs and/or code. In this regard, the applications, programs, and/or code may enable configuring or controlling of operation of the TDM-MSS 202, BT-MSS 204, and/or the memory subsystem 208. Although the processor subsystem 206 is shown as being separate from the TDM subsystem 202 and the BT-MSS 204, the invention is not so limited. The processor subsystem 206, and/or functions of the processor subsystem 206, may be implemented in, or performed by, one or both of the TDM subsystem 202 and Bluetooth subsystem 204.

The memory subsystem 208 may comprise suitable logic, circuitry, interface(s), and/or code that may enable storage or programming of information that includes parameters and/or code that may effectuate the operation of the multi-standard multi-radio communication system 106. The parameters may comprise configuration data and the code may comprise operational code such as software and/or firmware, but the information need not be limited in this regard. Moreover, the parameters may include adaptive filter and/or block coefficients. Additionally, the memory subsystem 208 may buffer or otherwise store received data and/or data to be transmitted. Although the memory subsystem 208 is shown as a separate subsystem, the invention is not so limited. The memory subsystem 208 and/or functions of the memory subsystem 208 may be implemented in, or performed by, one or both of the TDM-MSS 202 and BT-MSS 204.

In operation, the TDM-MSS 202 may generate one or more signals which may be utilized to determine when the BT-MSS 204 should be enabled transmit signals. In this regard, the TDM-MSS 110 may generate a FRAME_SYNC signal which may enable synchronization of the BT-MSS 112 to the TDM-MSS 110. Additionally, the TDM-MSS 206 may be operable to generate a system active (SYS_ACTIVE) signal that may indicate when the TDM-MSS 206 is receiving. Accordingly, aspects of the invention may enable the BT-MSS 122 to utilize the SYS_ACTIVE signal to determine when it may transmit BT signals. Complete avoidance of interfering with communications of the TDM-MSS 110, however, may cause significant delay in the establishment of BT connections between the BT-MSS 112 and other BT devices, or may prevent such connections altogether. Accordingly, various aspects of the invention may enable the BT-MSS 112 to honor the SYS_ACTIVE signal most of the time, but may also enable the BT-MSS 112 to ignore the SYS_ACTIVE signal at times when it is desirable to quickly and reliably establish a BT connection.

Figure 3A:
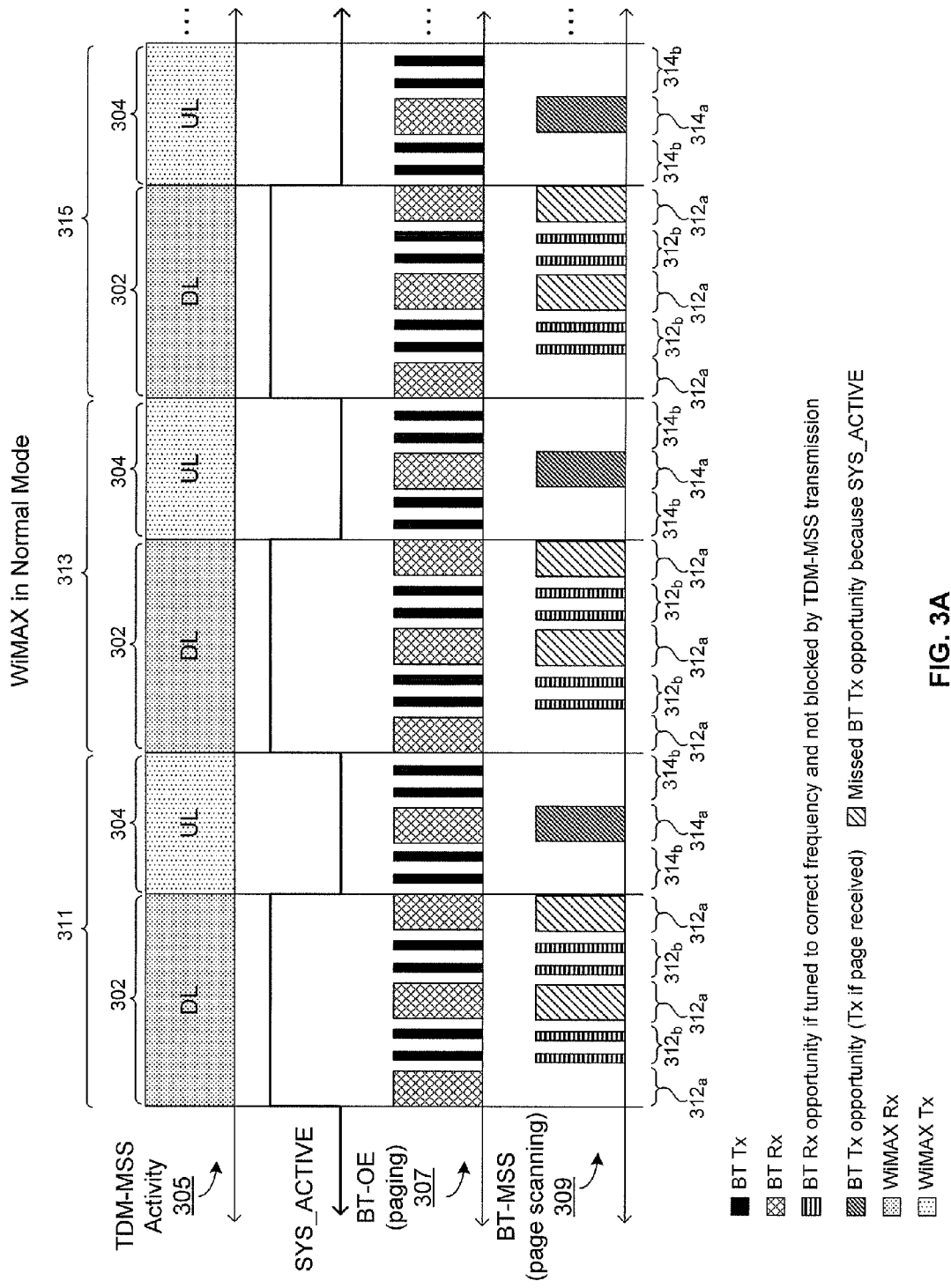
FIG. 3A is an exemplary timing diagram illustrating connection establishment in a multi-standard system in which a TDM subsystem operates in a normal mode of operation in which the TDM subsystem transmits and receives in every frame, in connection with an embodiment of the invention.

FIG. 3A is an exemplary timing diagram illustrating connection establishment in a multi-standard system in which a TDM subsystem operates in a normal mode of operation in which the TDM subsystem transmits and receives in every frame, in connection with an embodiment of the invention. Referring to FIG. 3A, there is shown—during TDM timeslots 311, 313, and 315—activity 305 of the TDM-MSS 110 (FIG. 1), activity 307 of the BT-OE 108 (FIG. 1), and activity 309 of the BT-MSS 112 (FIG. 1). During the TDM timeslots 311, 313, and 315, the BT-OE 108 is paging and the BT-MSS 112 is page scanning. To prevent interfering with communications between the transceiver 104 and the TDM-MSS 110, the SYS_ACTIVE signal (FIG. 2) may control when the BT-MSS 112 may transmit BT signals. While page scanning, the BT-MSS 112 may have its receiver on continuously until it detects a page signal. After receiving a page signal, the BT-MSS 112 may respond 625 microseconds (plus or minus a tolerance) later with a transmission of an ID packet.

Establishing a BT connection requires the exchange of at least four packets, and thus requires BT communication during at least four BT timeslots. That is, the paging (master) device sends a page packet in BT timeslot n, the scanning (slave) device responds with an ID packet in BT timeslot n+1, the paging (master) device then sends a frequency hopping sequence (FHS) packet in one of the next 8 BT timeslots n+2, n+4, . . . n+16, and the paged (slave) device transmits an ID packet in the timeslot immediately after detecting the FHS packet.

During the portions 302 of the TDM timeslots 311, 313, and 315, the SYS-ACTIVE signal may indicate that the TDM-MSS 110 is receiving from the transceiver 104 (FIG. 1). While the SYS_ACTIVE signal indicates that the TDM-MSS 110 is receiving, the BT-MSS 112 may be prevented from transmitting so as not to interfere with communications between the TDM-MSS 110 and the transceiver 104. Consequently, in instances that the BT-OE 108 pages the BT-MSS 112 during one of BT timeslots 312b, the BT-MSS 112 may be unable to respond with an ID packet during the subsequent BT timeslot 312a.

While the TDM-MSS 110 is transmitting, the BT-MSS 112 may be de-sensitized and unable to receive BT signals. Consequently, in instances that the BT-OE 108 pages the BT-MSS 112 during one of the BT timeslots 314b, the BT-MSS 108 may be unable to receive the page packet. Thus, for the exemplary timing that is illustrated in FIG. 3A, the BT-MSS 112 may be unable to establish a BT connection to the BT-OE 108 because establishing a BT connection requires an exchange of messages in four BT timeslots.

Figure 3B:
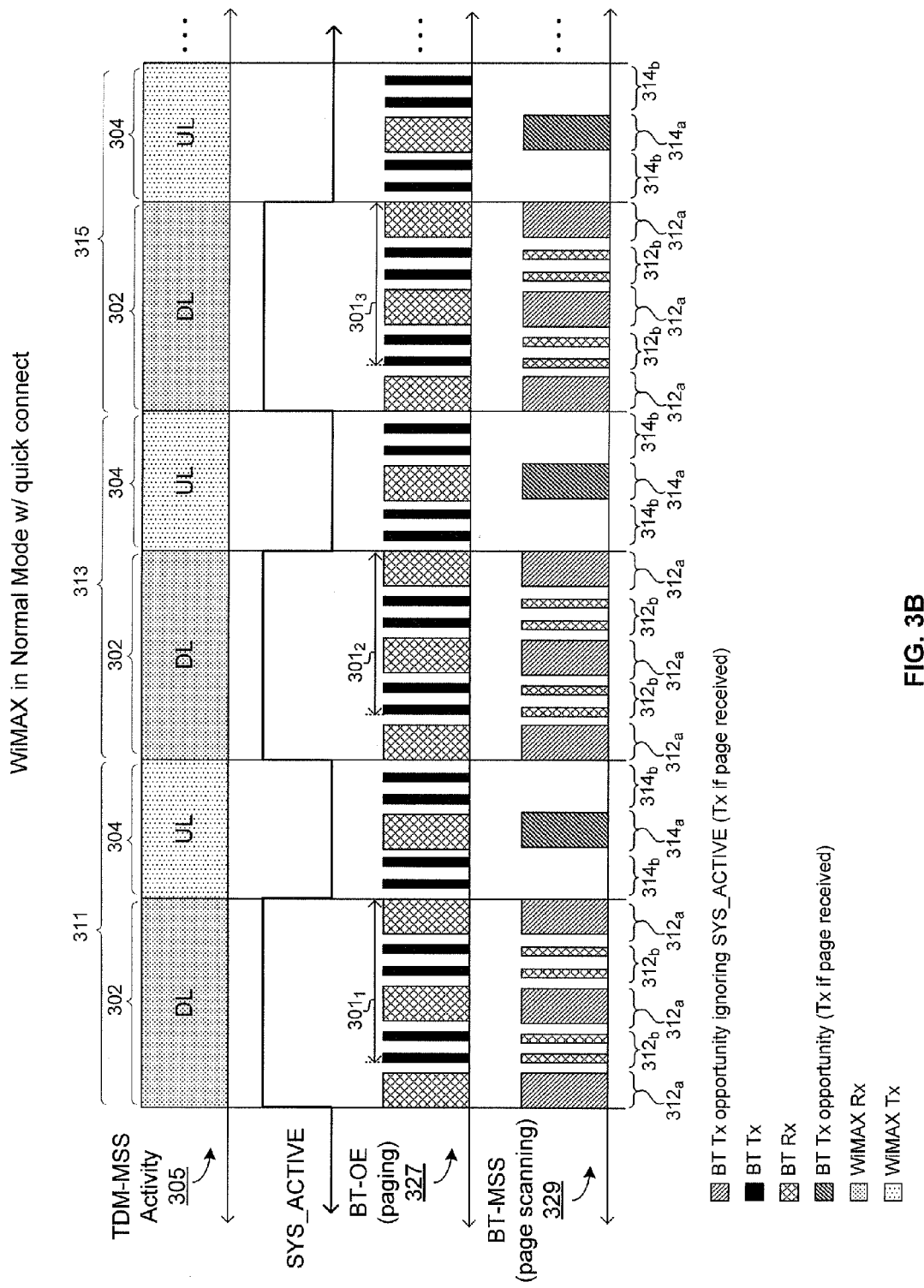
FIG. 3B is an exemplary timing diagram illustrating BT connection establishment in a multi-standard system in which a TDM subsystem operates in a normal mode of operation, in accordance with an embodiment of the invention.

FIG. 3B is an exemplary timing diagram illustrating BT connection establishment in a multi-standard multi-radio communication system in which a TDM subsystem operates in a normal mode of operation, in accordance with an embodiment of the invention. Referring to FIG. 3B, there is shown the timeslots 311, 313, and 315, which are depicted in FIG. 3A. As opposed to FIG. 3A, where the BT-MSS 112 and the BT-OE 108 may be unable to establish a connection, FIG. 3B illustrates establishing a BT connection utilizing various aspects of the invention. In this regard, aspects of the invention may be operable to allow the BT-MSS 112 to ignore SYS_ACTIVE signal for a brief time period in order to establish a BT connection.

During the portions 302 of the timeslots 311, 313, and 315, the SYS_ACTIVE signal may indicate that the TDM-MSS 110 is receiving data from the transceiver 104 (FIG. 1). While the SYS_ACTIVE signal indicates that the TDM-MSS 110 is receiving, the BT-MSS 112 may generally be prevented from transmitting so as not to interfere with communications between the TDM-MSS 110 and the transceiver 104. However, in instances that the BT-MSS 112 receives a page or FHS packet during a BT timeslot 312b, the BT-MSS 112 may temporarily ignore the SYS_ACTIVE signal, and may transmit an ID packet during the subsequent BT timeslot 312a. In this manner, the BT-MSS 112 may be able to respond to the page and FHS packets within an amount of time required by BT standards. Thus, for the exemplary timing in FIG. 3B, aspects of the invention may create opportunities $301_1$, $301_2$, and $301_3$ for establishing a BT connection. Although transmission by the BT-MSS 112 during a BT timeslot 312a may interfere with reception of the TDM-MSS 110, the BT connection events may be relatively short and/or infrequent and the TDM-MSS 110 may easily recover utilizing, for example, retransmission.

Figure 4A:
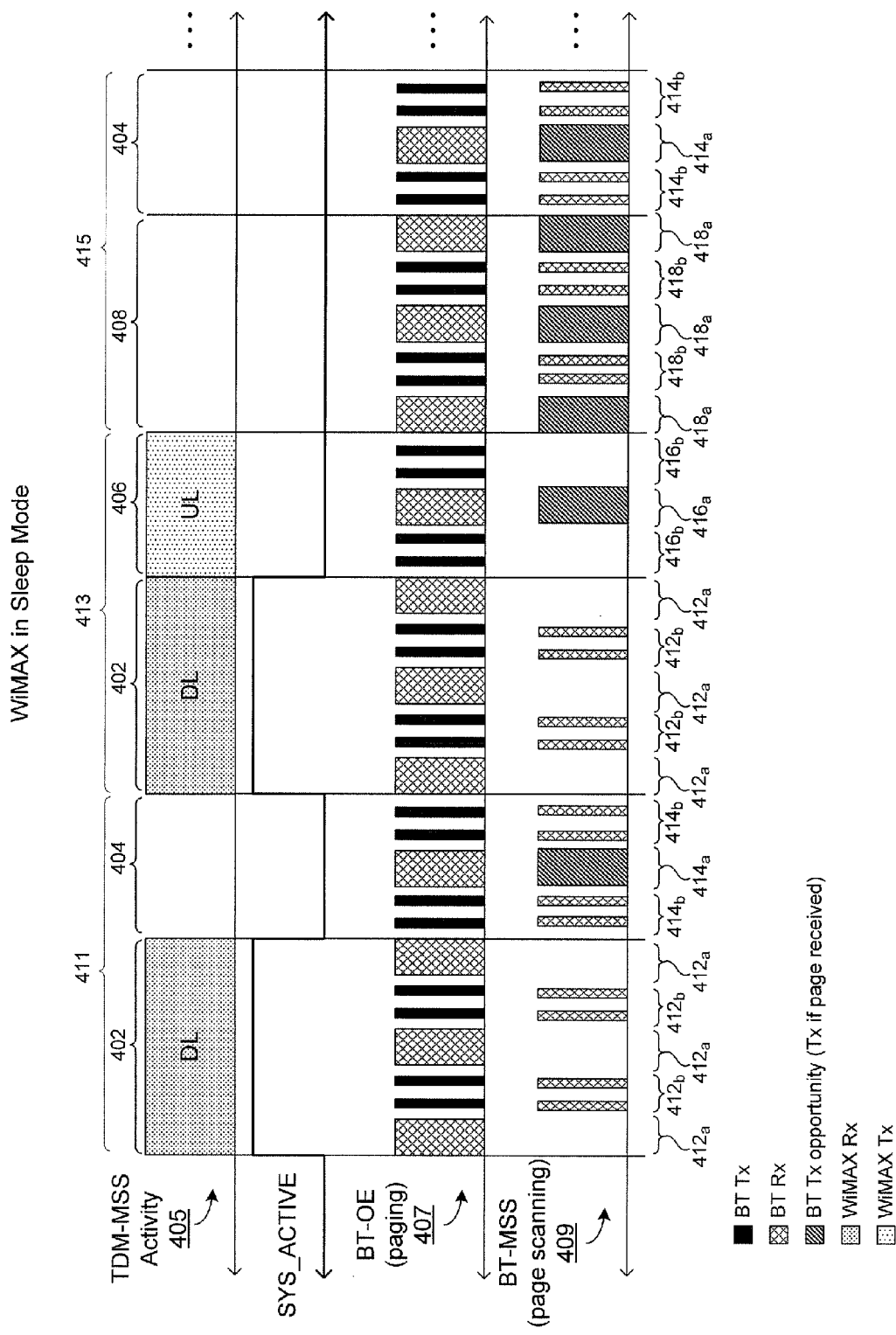
FIG. 4A is an exemplary timing diagram associated with a conventional multi-standard system in which a TDM subsystem operates in a sleep mode of operation in which the TDM subsystem is periodically inactive for some frames, in connection with an embodiment of the invention.

FIG. 4A is an exemplary timing diagram associated with a conventional multi-standard system in which a TDM subsystem operates in a sleep mode of operation in which the TDM subsystem is periodically inactive for some frames, in connection with an embodiment of the invention. Referring to FIG. 4A, there is shown, during timeslots 411, 413, and 415, activity 405 of the TDM-MSS 110 (FIG. 1), activity 407 of the BT-OE 108 (FIG. 1), and activity 409 of the BT-MSS 112 (FIG. 1). During the timeslots 411, 413, and 415, the BT-OE 108 is paging and the BT-MSS 112 is page scanning. To prevent interfering with communications between the transceiver 104 and the TDM-MSS 110, the SYS_ACTIVE signal (FIG. 2) may control when the BT-MSS 112 may transmit BT signals.

During the portions 402 of the TDM timeslots 411 and 413, the SYS_ACTIVE signal may indicate that the TDM-MSS 110 is receiving from the transceiver 104. Consequently, in instances that the BT-OE 108 pages the BT-MSS 112 during one of BT timeslots 412b, the BT-MSS 112 may be unable to respond with an ID packet during the subsequent BT timeslot 412a. Thus, for the exemplary timing that is illustrated in FIG. 4A, the BT-MSS 112 may be prevented from transmitting and thus prevented from establishing a BT connection with the BT-OE during the portions 402.

During the portion 406 of the timeslot 413, the TDM-MSS 110 is transmitting to the transceiver 104. Accordingly, the transmissions by the TDM-MSS 110 may cause the BT-MSS 112 to be de-sensitized and unable to receive BT signals. Consequently, if the BT-OE 108 pages the BT-MSS 112 during a BT timeslot 416b, the BT-MSS 112 may not receive the page. Thus, for the exemplary timing in FIG. 4A, the BT-MSS 112 may be unable to establish a connection with the BT-OE during the portion 406.

During the portions 404 of the timeslot 411 and 415 and during the portion 408 of the timeslot 415, the TDM-MSS 110 is inactive. During such times, the BT-MSS 112 may transmit and/or receive signals. In this regard, the BT-MSS 112 may transmit during BT timeslots 418a and 414a and receive during BT timeslots 418b and 414b. Thus, for the exemplary timing of FIG. 4A, opportunities to establish a BT connection in conventional multi-standard systems may be limited to times when the TDM-MSS 110 is inactive.

Figure 4B:
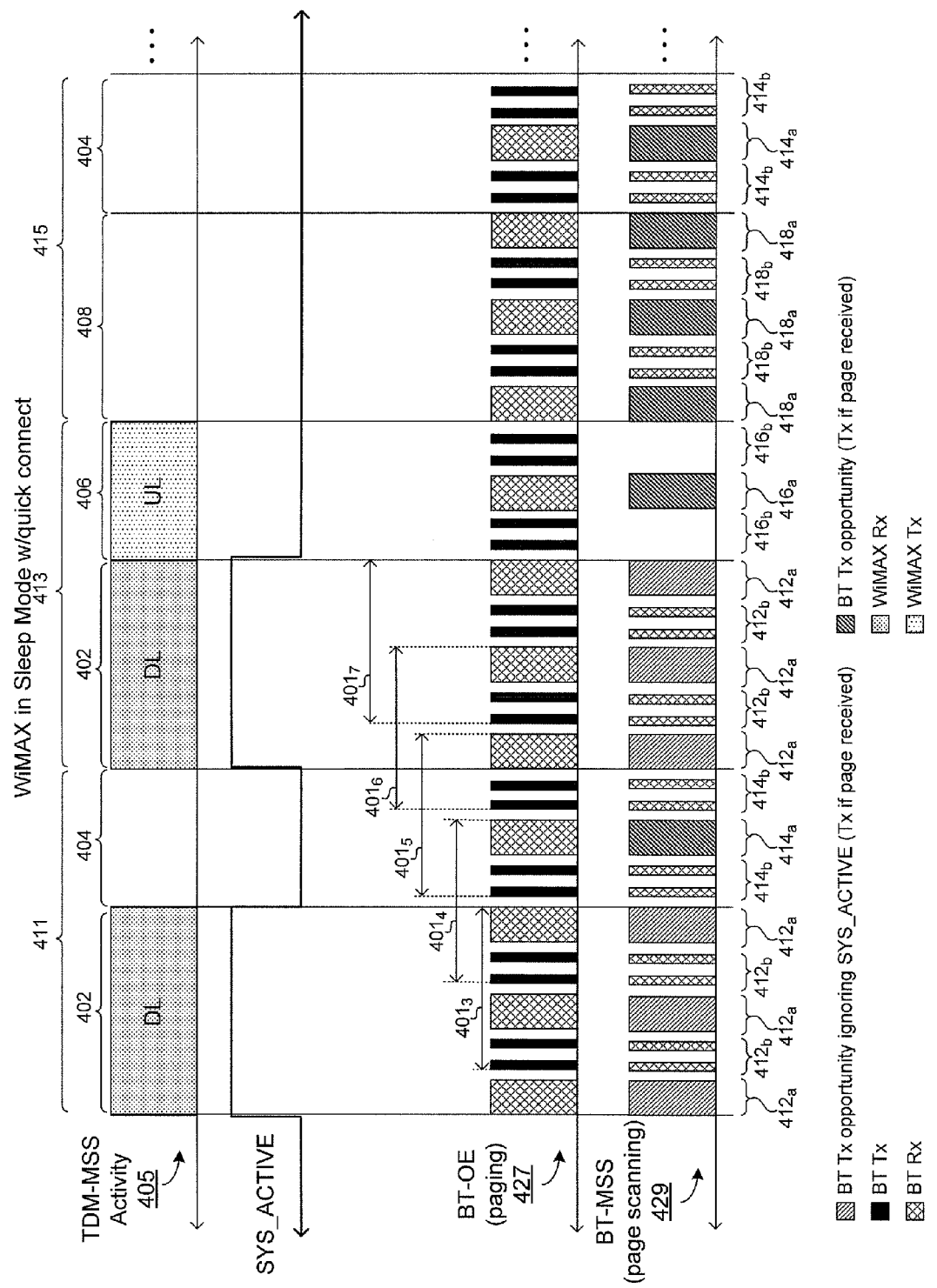
FIG. 4B is an exemplary timing diagram illustrating BT connection establishment in a multi-standard multi-radio communication system in which a TDM subsystem operates in a sleep mode of operation, in accordance with an embodiment of the invention.

FIG. 4B is an exemplary timing diagram illustrating BT connection establishment in a multi-standard multi-radio communication system in which a TDM subsystem operates in a sleep mode of operation, in accordance with an embodiment of the invention. Referring to FIG. 4B, there is shown the timeslots 411, 413, and 415, which are depicted in FIG. 4A. As opposed to FIG. 4A, where opportunities to establish a BT connection were limited to periods when the TDM-MSS 110 was inactive, FIG. 4B illustrates establishment of a BT connection utilizing aspects of the invention. In this regard, aspects of the invention may enable the BT-MSS 112 to ignore SYS-ACTIVE signal for a brief time period in order to establish a BT connection.

During the portions 402 of the timeslots 411 and 413, the SYS_ACTIVE signal indicates that the TDM-MSS 110 is receiving data from the transceiver 104 (FIG. 1). While the SYS_ACTIVE signal indicates that the TDM-MSS 110 is receiving, the BT-MSS 112 may generally be prevented from transmitting so as not to interfere with communications between the TDM-MSS 110 and the transceiver 104. However, if the BT-MSS 112 receives a page or FHS packet during a BT timeslot 412b, the BT-MSS 112 may temporarily ignore the SYS_ACTIVE signal, and may transmit an ID packet during the subsequent BT timeslot 412a. In this manner, the BT-MSS 112 may be able to respond to page and FHS packets within an amount of time required by BT standards. Thus, for the exemplary timing that is illustrated in FIG. 4B, various aspects of the invention may create opportunities $401_3, \ldots, 401_7$ for establishing a BT connection. Although transmission by the BT-MSS 112 during a BT timeslot 412a may interfere with reception of the TDM-MSS 110, the BT connection events may be relatively short and/or infrequent and the TDM-MSS 110 may recover utilizing, for example, retransmission.

Figure 5A:
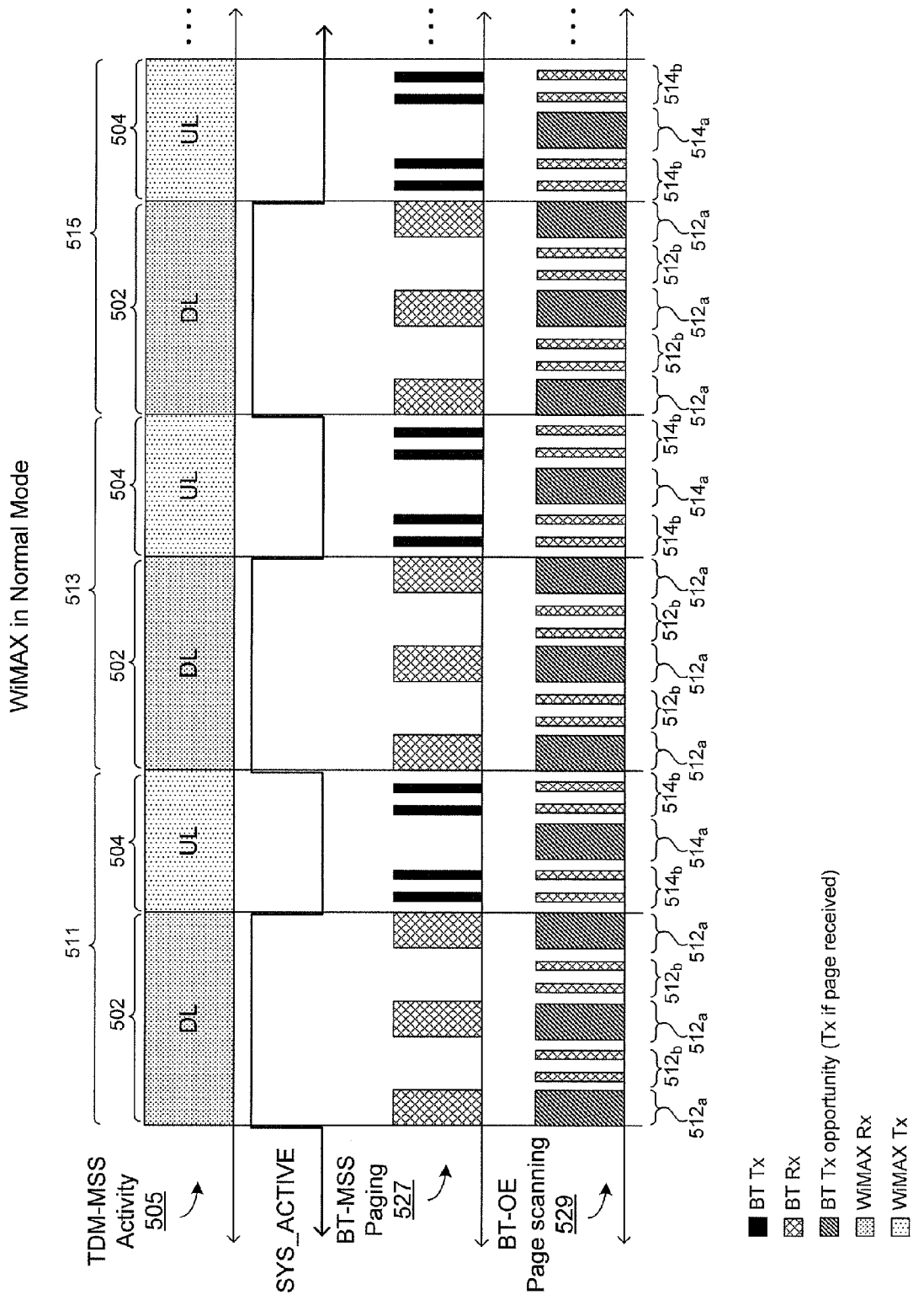
FIG. 5A is an exemplary timing diagram associated with a conventional multi-standard system in which a TDM subsystem operates in a normal mode of operation, in connection with an embodiment of the invention.

FIG. 5A is an exemplary timing diagram associated with a conventional multi-standard system in which a TDM subsystem operates in a normal mode of operation, in connection with an embodiment of the invention. Referring to FIG. 5A, there is shown, during TDM timeslots 511, 513, and 515, activity 505 of the TDM-MSS 110 (FIG. 1), activity 507 of the BT-OE 108 (FIG. 1), and activity 509 of the BT-MSS 112 (FIG. 1). During the TDM timeslots 511, 513, and 515, the BT-MSS 112 is paging and the BT-OE 108 is page scanning. To prevent interference with communications between the transceiver 104 and the TDM-MSS 110, the SYS_ACTIVE signal (FIG. 2) may control when the BT-MSS 112 may transmit BT signals and may also indicate when the BT-MSS 112 may reliably receive BT signals.

During the portions 502 of the TDM timeslots 511, 513, and 515, the SYS-ACTIVE signal may indicate that the TDM-MSS 110 is receiving from the transceiver 104 (FIG. 1). While the SYS_ACTIVE signal indicates that the TDM-MSS 110 is receiving, the BT-MSS 112 may be prevented from transmitting so as not to interfere with communications between the TDM-MSS 110 and the transceiver 104. Consequently, for the exemplary timing of FIG. 5A, the BT-MSS 108 may be unable to send page packets during the timeslots 512b, and thus unable to establish BT connections, during the portions 502.

During the portions 504 of the timeslots 511, 513, and 515, the TDM-MSS 110, the TDM-MSS 110 is transmitting to the transceiver 104. While the TDM-MSS 110 is transmitting, the BT-MSS 112 may be de-sensitized and unable to receive BT signals. Consequently, during the BT timeslots 514a, the BT-MSS 112 may be unable to receive ID packets sent by the BT-OE 108 in response to page or FHS packets sent by the BT-MSS 112. Thus, for the exemplary timing that is illustrated in FIG. 5A, the BT-MSS 112 may be unable to establish a BT connection to the BT-OE 108 because the establishment of a BT connection requires an exchange of messages in four BT timeslots.

Figure 5B:
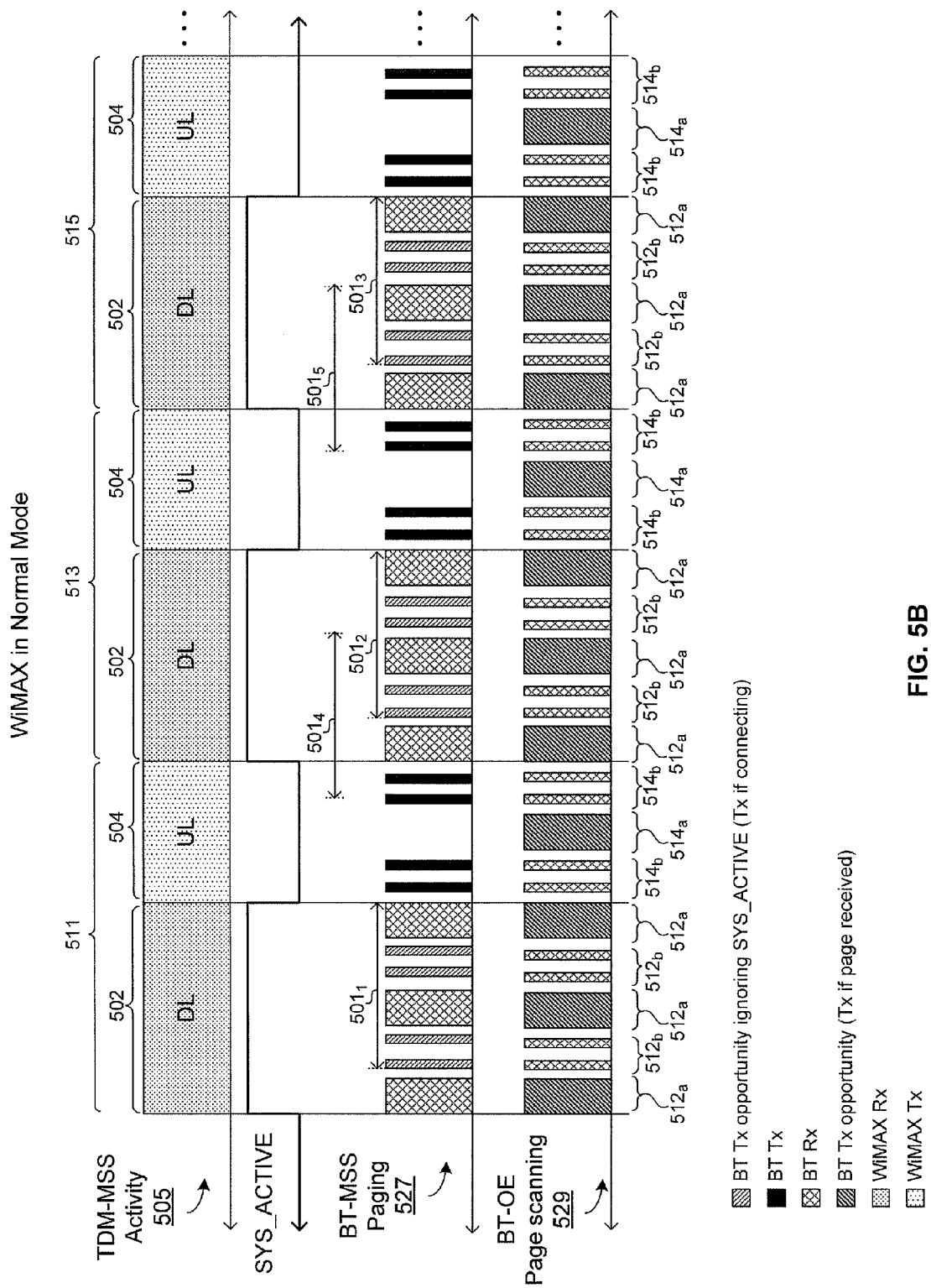
FIG. 5B is an exemplary timing diagram illustrating BT connection establishment in a multi-standard system in which a TDM subsystem operates in a normal mode of operation, in accordance with an embodiment of the invention.

FIG. 5B is an exemplary timing diagram illustrating BT connection establishment in a multi-standard multi-radio system in which a TDM subsystem operates in a normal mode of operation, in accordance with an embodiment of the invention. Referring to FIG. 5B, there is shown the timeslots 511, 513, and 515, which are depicted in FIG. 5A. As opposed to FIG. 5A, where the BT-MSS 112 and the BT-OE 108 were unable to establish a connection, FIG. 5B illustrates establishment of a BT connection utilizing various aspects of the invention. In this regard, aspects of the invention may be operable to allow the BT-MSS 112 to ignore SYS-ACTIVE signal for a brief time period in order to establish a BT connection.

During the portions 502 of the timeslots 511, 513, and 515, the SYS_ACTIVE signal may indicate that the TDM-MSS 110 is receiving data from the transceiver 104 (FIG. 1). While the SYS-ACTIVE signal indicates that the TDM-MSS 110 is receiving, the BT-MSS 112 may generally be prevented from transmitting so as not to interfere with communications between the TDM-MSS 110 and the transceiver 104. However, the BT-MSS 112 may temporarily ignore the SYS_ACTIVE signal to transmit one or more page packets during a timeslot 512b and/or one or more FHS packets during a timeslot 512b in order to connect to the BT-OE 108. In this manner, the BT-MSS 108 and the BT-MSS 112 may exchange packets in a timely manner required to establish a BT connection. In an exemplary embodiment of the invention, the BT-MSS 112 may refrain from sending page packets during the BT timeslots 512b, but may transmit FHS packets during a BT timeslot 512b if a page response is received during the previous BT timeslot 512a.

Thus, for the exemplary timing illustrated in FIG. 5B, aspects of the invention may create opportunities $501_1$, $501_2$, $501_3$, $501_4$, and $501_5$ for establishing a BT connection. Although transmission by the BT-MSS 112 during a BT timeslot 512b may interfere with reception of the TDM-MSS 110, the BT connection events may be relatively short and/or infrequent and the TDM-MSS 110 may easily recover utilizing, for example, retransmission.

Figure 6A:
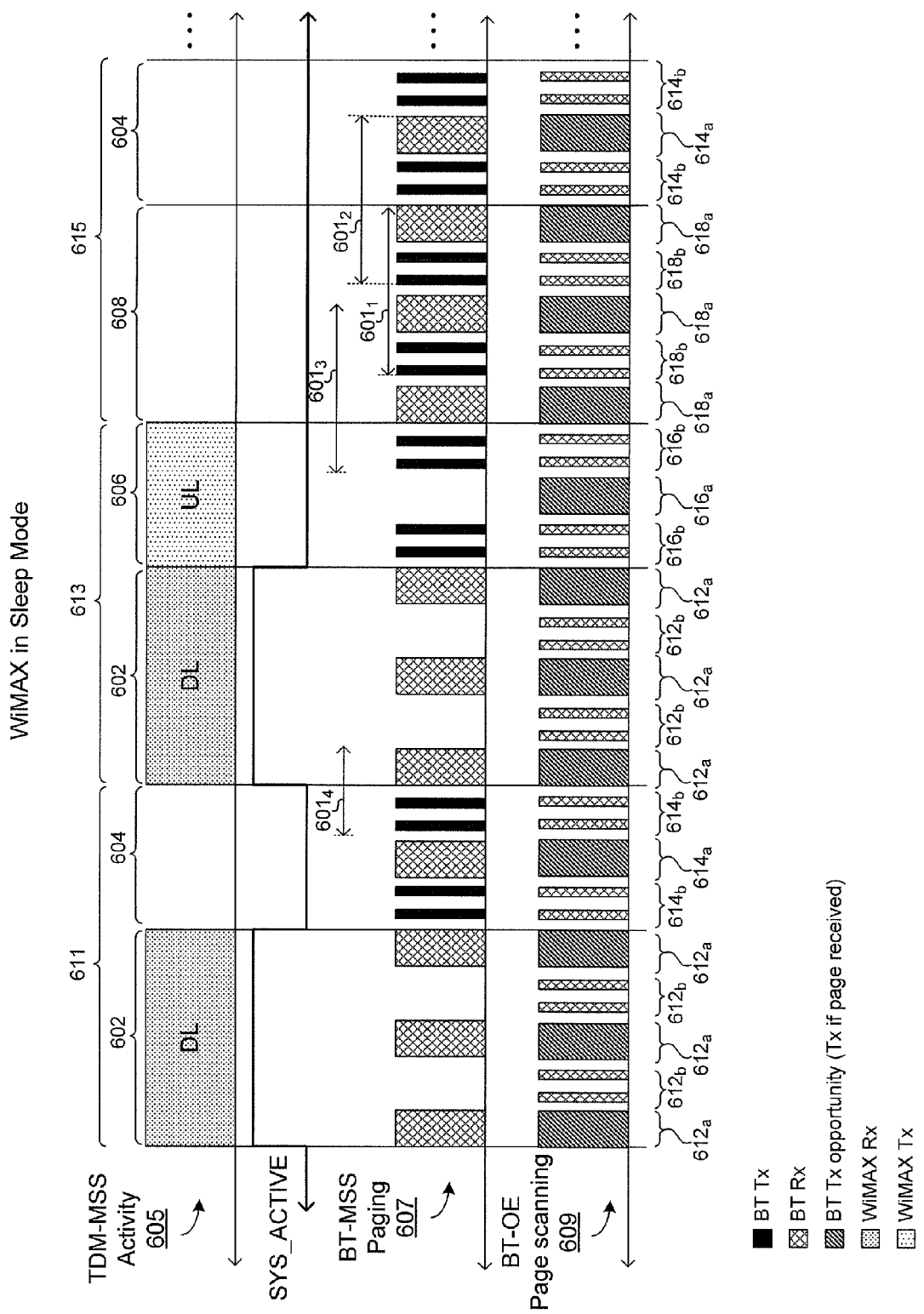
FIG. 6A is an exemplary timing diagram associated with a conventional multi-standard system in which a TDM subsystem operates in a sleep mode of operation, in connection with an embodiment of the invention.

FIG. 6A is an exemplary timing diagram associated with a conventional multi-standard multi-radio system in which a TDM subsystem operates in a sleep mode of operation, in connection with an embodiment of the invention. Referring to FIG. 6A, there is shown, during timeslots 611, 613, and 615, activity 605 of the TDM-MSS 110 (FIG. 1), activity 607 of the BT-OE 108 (FIG. 1), and activity 609 of the BT-MSS 112 (FIG. 1). During the timeslots 611, 613, and 615, the BT-MSS 112 is paging and the BT-OE 108 is page scanning. To prevent interference with communications between the transceiver 104 and the TDM-MSS 110, the SYS-ACTIVE signal (FIG. 2) may control when the BT-MSS 112 may transmit BT signals and indicate when the BT-MSS 112 may reliably receive BT signals.

During the portions 602 of the TDM timeslots 611 and 613, the SYS_ACTIVE signal may indicate that the TDM-MSS 110 is receiving from the transceiver 104. Accordingly, for the exemplary timing of FIG. 6A, the BT-MSS 112 may be prevented from transmitting during BT timeslots 612a and thus prevented from establishing a BT connection with the BT-OE during the portions 602.

During the portion 606 of the timeslot 613, the TDM-MSS 110 is transmitting to the transceiver 104. Accordingly, the transmissions by the TDM-MSS 110 may cause the BT-MSS 112 to be de-sensitized and unable to receive BT signals during BT timeslots 616a. Thus, for the exemplary timing in FIG. 6A, the BT-MSS 112 may be unable to establish a connection with the BT-OE during the portion 606.

During the portions 604 of the timeslots 611 and 615 and during the portion 608 of the timeslot 615, the TDM-MSS 110 is inactive. Accordingly, the BT-MSS 112 may transmit during BT timeslots 614b and 618b and/or receive during BT timeslots 614a and 618a. Thus, for the exemplary timing of FIG. 6A, opportunities to establish BT connections in conventional multi-standard systems are limited to times when the TDM-MSS 110 is inactive.

Figure 6B:
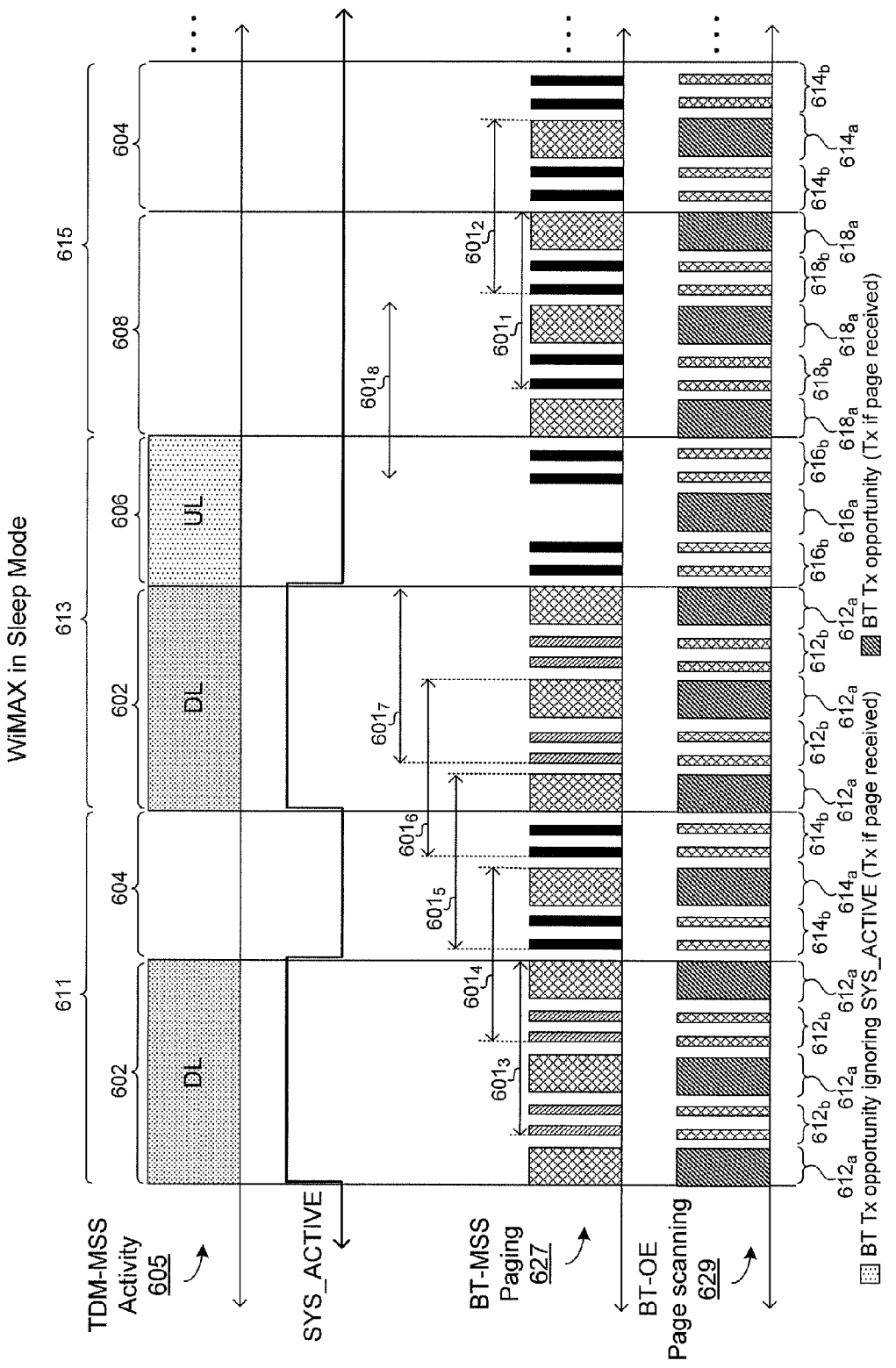
FIG. 6B is an exemplary timing diagram illustrating BT connection establishment in a multi-standard system in which a TDM subsystem operates in a sleep mode of operation, in accordance with an embodiment of the invention.

FIG. 6B is an exemplary timing diagram illustrating BT connection establishment in a multi-standard system in which a TDM subsystem operates in a sleep mode of operation, in accordance with an embodiment of the invention. Referring to FIG. 6B, there is shown the timeslots 611, 613, and 615, which are depicted in FIG. 6A. As opposed to FIG. 6A, where opportunities to establish a BT connection were limited to periods when the TDM-MSS 110 was inactive, FIG. 6B illustrates establishing a BT connection utilizing aspects of the invention. In this regard, aspects of the invention allow the BT-MSS 112 to ignore SYS-ACTIVE signal for a brief time period to establish a BT connection.

During the portions 602 of the timeslots 611 and 613, the SYS-ACTIVE signal may indicate that the TDM-MSS 110 is receiving data from the transceiver 104 (FIG. 1). While the SYS-ACTIVE signal indicates that the TDM-MSS 110 is receiving, the BT-MSS 112 may generally be prevented from transmitting so as not to interfere with communications between the TDM-MSS 110 and the transceiver 104. However, the BT-MSS may temporarily ignore the SYS_ACTIVE signal, and may transmit one or more page and/or FHS packet during the BT timeslots 612b. In this manner, the BT-MSS 108 and the BT-MSS 112 may exchange packets in the timely manner required to establish a BT connection. In an exemplary embodiment of the invention, the BT-MSS 112 may refrain from sending page packets during the BT timeslots 612b, but may transmit FHS packets during a BT timeslot 612b if a page response is received during the previous BT timeslot 612a.

Thus, for the exemplary timing of FIG. 6B, aspects of the invention may create opportunities $601_3, \ldots, 601_8$ for establishing a BT connection. Although transmission by the BT-MSS 112 during a BT timeslot 612b may interfere with reception of the TDM-MSS 110, the BT connection events may be relatively short and/or infrequent and the TDM-MSS 110 may easily recover utilizing, for example, retransmission.

Figure 7A:
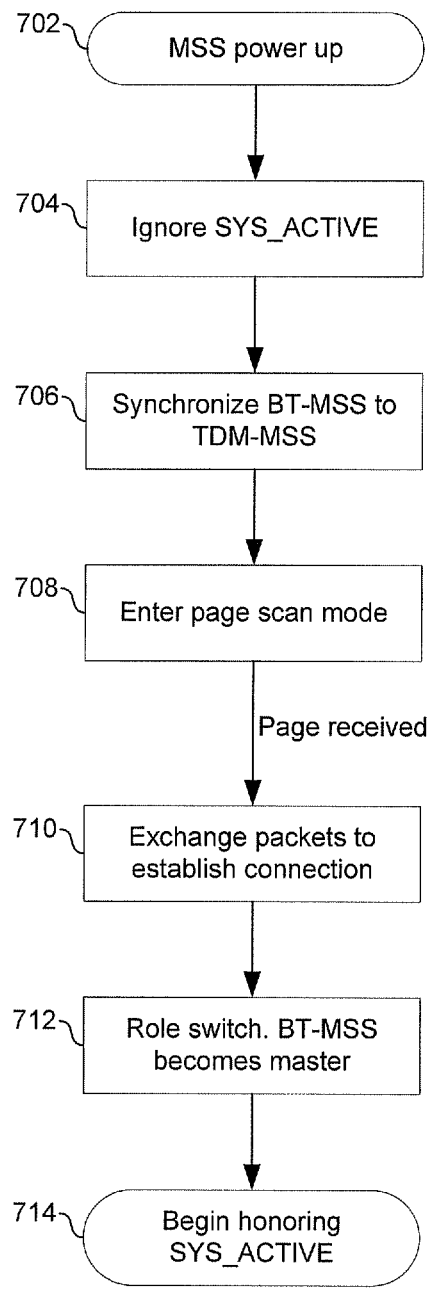
FIG. 7A is a flowchart illustrating exemplary steps for establishing a BT connection in a multi-standard system, where the Bluetooth portion of the multi-standard system functions as a slave, in accordance with an embodiment of the invention.

FIG. 7A is a flowchart illustrating exemplary steps for establishing a BT connection in a multi-standard system, where the Bluetooth portion of the multi-standard system functions as a slave, in accordance with an embodiment of the invention. Referring to FIG. 7A, the exemplary steps may begin with step 702 when the multi-standard multi-radio communication system 106 is powered up. Subsequent to step 702, the exemplary steps may advance to step 704.

In step 704, the BTT-MSS 112 may power up in a state in which the SYS_ACTIVE signal from the TDM-MSS 110 is ignored. In this state, the BT-MSS 112 may be enabled to transmit when it receives a page packet, regardless of what the TDM-MSS 110 is doing. Subsequent to step 704, the exemplary steps may advance to step 706.

In step 706, the BT-MSS 112 may synchronize to the TDM-MSS 110. Subsequent to step 706, the exemplary steps may advance to step 708.

In step 708, the BT-MSS may enter a page scan mode and may listen for a page packet from the BT-OE 108. When the BT-MSS 112 receives a page packet from the BT-OE 108, the exemplary steps may advance to step 710.

In step 710, the BT-MSS 710 may respond to the page packet by transmitting an ID packet to the BT-OE 108. In response to the ID packet the BT-OE 108 may send an FHS packet and the BT-MSS device 112 may again respond by transmitting an ID packet. The BT-MSS 112 may transmit the ID packets regardless of whether the TD-MSS 110 is receiving at the time. In this manner, a BT connection may be established between the BT-MSS 112, functioning as a slave, and the BT-OE 108 functioning as a master. Subsequent to step 710, the exemplary steps may advance to step 712.

In step 712, the BT-MSS 112 and the BT-OE 108 may reverse roles such that the BT-MSS 108 may become the master device and the BT-OE 108 may become the slave device. Becoming the master device may enable the BT-MSS 112 to determine when BT communications occur and thus may enable the BT-MSS 112 to avoid further interference with communications of the TDM-MSS 110. Subsequent to step 712, the exemplary steps may advance to step 714.

In step 714, after the BT connection has been established, the BT-MSS 112 may begin honoring the SYS_ACTIVE signal and may only transmit when the TDM-MSS 110 is not receiving.

Figure 7B:
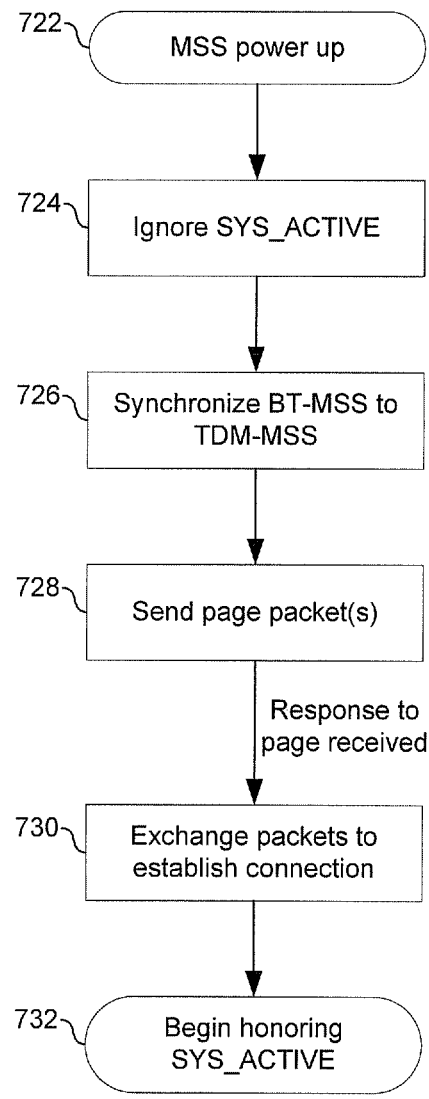
FIG. 7B is a flowchart illustrating exemplary steps for establishing a BT connection in a multi-standard system, where the Bluetooth portion of the multi-standard system functions as a master, in accordance with an embodiment of the invention.

FIG. 7B is a flowchart illustrating exemplary steps for establishing a BT connection in a multi-standard system, where the Bluetooth portion of the multi-standard multi-radio communication system functions as a master, in accordance with an embodiment of the invention. Referring to FIG. 7B, the exemplary steps may begin with step 702 when the multi-standard multi-radio communication system 106 is powered up. Subsequent to step 722, the exemplary steps may advance to step 724.

In step 724, the BTT-MSS 112 may power up in a state in which the SYS_ACTIVE signal from the TDM-MSS 110 is ignored. In this state, the BT-MSS 112 may refrain from sending page packets but may transmit an FHS packet if it receives an ID packet in response to a previously sent page packet. Subsequent to step 724, the exemplary steps may advance to step 726.

In step 726, the BT-MSS 112 may synchronize to the TDM-MSS 110. Subsequent to step 706, the exemplary steps may advance to step 728.

In step 728, the BT-MSS may enter a paging mode and may send a page packet to the BT-OE 108 at a time that the TDM-MSS 110 is not receiving. The BT-MSS 112 may then listen for an ID packet from the BT-OE 108. When the BT-MSS 112 receives an ID packet from the BT-OE 108 in response to the page, the exemplary steps may advance to step 730.

In step 730, the BT-MSS 710 may respond to the ID packet by transmitting an FHS packet and/or other packets required to establish a BT connection, to the BT-OE 108. The BT-MSS 112 may transmit such packets regardless of whether the TD-MSS 110 is receiving at the time. In this manner, a BT connection may be established between the BT-MSS 112, functioning as a master, and the BT-OE 108 functioning as a slave. Subsequent to step 730, the exemplary steps may advance to step 732.

In step 732, after the BT connection has been established, the BT-MSS 112 may begin honoring the SYS_ACTIVE signal and may only transmit when the TDM-MSS 110 is not receiving.

Various aspects of a method and system for Bluetooth connection setup in a multi-standard multi-radio communication system may be found in certain embodiments of the invention. In one exemplary embodiment of the invention, a Bluetooth system 204 may be operable to determine whether a coexistent time division multiplexing communication system 202 is receiving signals. The types of packets transmitted by the Bluetooth system 204 may be controlled based on the determination. In this regard, while the coexistent time division multiplexing communication system 202 is receiving signals, the Bluetooth system 204 may be limited to transmission of Bluetooth packets that enable establishment of a Bluetooth connection. For example, the Bluetooth system 204 may be limited to sending ID packets in response to page packets and FHS packets and/or may be limited to sending FHS packets. Also, the Bluetooth system 204 may refrain from transmitting packets while the Bluetooth system 204 is connected as a piconet master and while the time division multiplexing communication system 202 is receiving. After establishing a Bluetooth connection, the Bluetooth system 204 may switch from a piconet slave mode to a piconet master mode. Additionally, the Bluetooth system 204 may refrain from receiving Bluetooth signals while the time division multiplexing communication system 202 is transmitting. The Bluetooth system 204 may be synchronized to the time division multiplexing communication system 202. The time division multiplexing communication system 202 may, for example, comprise a WiMAX system or a LTE system. The time division multiplexing communication system 202 may operate in one of a normal mode and a sleep mode.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Bluetooth connection setup in a multi-standard multi-radio communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    determining, by a Bluetooth system, whether a coexistent time division multiplexing communication system is receiving signals based upon an activity signal received from said coexistent time division multiplexing communication system, where the activity signal indicates when said coexistent time division multiplexing communication system is receiving signals; and
    controlling transmissions of said Bluetooth system based on said determination, wherein said Bluetooth system is limited to transmission of Bluetooth packet types that enable establishment of a Bluetooth connection while said coexistent time division multiplexing communication system is receiving signals.

2. The method according to claim 1, comprising, while said time division multiplexing communication system is receiving signals, limiting said Bluetooth system to sending ID packets.

3. The method according to claim 1, comprising, while said time division multiplexing communication system is receiving signals, limiting said Bluetooth system to sending FHS packets.

4. The method according to claim 1, comprising, after establishing a Bluetooth connection, switching said Bluetooth system from a piconet slave mode to a piconet master mode.

5. The method according to claim 4, comprising, in response to switching said Bluetooth system to the piconet master mode, refraining from transmitting packets by said Bluetooth system while said Bluetooth system is connected as a piconet master and while said time division multiplexing communication system is receiving signals.

6. The method according to claim 1, wherein said Bluetooth system is synchronized to said time division multiplexing communication system.

7. The method according to claim 1, comprising refraining from receiving Bluetooth signals by said Bluetooth system while said time division multiplexing communication system is transmitting.

8. The method according to claim 1, wherein said time division multiplexing communication system comprises a WiMax system.

9. The method according to claim 1, wherein said time division multiplexing communication system comprises a LTE system.

10. The method according to claim 1, wherein said time division multiplexing communication system operates in one of a normal mode and a sleep mode.

11. A system for communication, the system comprising:
one or more processors for use in a Bluetooth system, wherein said one or more processors are operable to determine whether a coexistent time division multiplexing communication system is receiving signals based upon an activity signal received from said coexistent time division multiplexing communication system, where the activity signal indicates when said coexistent time division multiplexing communication system is receiving signals; and
based on said determination, said one or more processors are operable to control transmissions of said Bluetooth system, wherein said one or more processors is operable to limit said Bluetooth system to transmission of Bluetooth packet types that enable establishment of a Bluetooth connection while said coexistent time division multiplexing communication system is receiving signals.

12. The system according to claim 11, wherein, while said time division multiplexing communication system is receiving signals, said one or more processors are operable to limit said Bluetooth system to sending ID packets.

13. The system according to claim 11, wherein, while said time division multiplexing communication system is receiving signals, said one or more processors are operable to limit said Bluetooth system to sending FHS packets.

14. The system according to claim 11, wherein, after establishing a Bluetooth connection, said one or more processors are operable to switch said Bluetooth system from a piconet slave mode to a piconet master mode.

15. The system according to claim 14, wherein said one or more processors, in response to switching said Bluetooth system to the piconet master mode, enables said Bluetooth system to refrain from transmitting packets while said time division multiplexing communication system is receiving signals and while said Bluetooth system is connected as a piconet master.

16. The system according to claim 11, wherein said Bluetooth system is synchronized to said time division multiplexing communication system.

17. The system according to claim 11, wherein said one or more processors enables said Bluetooth system to refrain from receiving Bluetooth signals while said time division multiplexing communication system is transmitting.

18. The system according to claim 11, wherein said time division multiplexing communication system comprises a WiMax system.

19. The system according to claim 11, wherein said time division multiplexing communication system comprises a LTE system.

20. The system according to claim 11, wherein said time division multiplexing communication system operates in one of a normal mode and a sleep mode.

21. A system for communication, the system comprising:
a time division multiplexing communication system configured to provide an indication of whether the time division multiplexing communication system is receiving signals from another communication system; and
a Bluetooth system configured to limit transmissions of the Bluetooth system in response to the indication of the time division multiplexing communication system, where the transmissions are limited to packet types that enable establishment of a connection with another Bluetooth system.

22. The system of claim 21, wherein the Bluetooth system configured to limit the transmissions of the Bluetooth system to ID packets when the Bluetooth system is connected as a piconet slave.

23. The system of claim 21, wherein the Bluetooth system configured to limit the transmissions of the Bluetooth system to FHS packets when the Bluetooth system is connected as a piconet master.

* * * * *